United States Patent
Wu

(10) Patent No.: US 7,820,259 B2
(45) Date of Patent: Oct. 26, 2010

(54) HOUSING, INJECTION MOLD FOR MAKING THE HOUSING, AND METHOD FOR MAKING THE HOUSING BY USING THE INJECTION MOLD

(75) Inventor: Chen-Hui Wu, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 208 days.

(21) Appl. No.: 11/964,849

(22) Filed: Dec. 27, 2007

(65) Prior Publication Data

US 2009/0092838 A1    Apr. 9, 2009

(30) Foreign Application Priority Data

Oct. 9, 2007  (CN) .................. 2007 1 0201960

(51) Int. Cl.
*B29D 22/00*  (2006.01)
*B29D 23/00*  (2006.01)
*B32B 1/08*  (2006.01)

(52) U.S. Cl. .................... 428/35.7; 428/35.2; 428/34.1; 455/575.8

(58) Field of Classification Search ................ 428/35.2, 428/35.7, 34.1; 455/575.8
See application file for complete search history.

(56) References Cited

U.S. PATENT DOCUMENTS

2006/0068136 A1*  3/2006  Kinjou et al. .............. 428/34.1
2008/0227507 A1*  9/2008  Joo ......................... 455/575.8

* cited by examiner

*Primary Examiner*—Michael C Miggins
(74) *Attorney, Agent, or Firm*—Jeffrey T. Knapp

(57) ABSTRACT

An injection mold (20) includes a female mold (22) and a male mold (24) matingly engageable with the female mold. The female mold has a recess portion (222) defined therein. The male mold includes a mold core (240) mounted thereon corresponding to the recess portion of the female mold. The mold core includes a grating pattern (241) defined thereon and a first injection runner (244). The grating pattern is formed by a plurality of crisscrossed grooves (2412). The first injection runner communicates with at least one of the grooves of the grating pattern. A housing (10) made by the injection mold and method for making the housing by using the injection mold are also provided.

9 Claims, 6 Drawing Sheets

HOUSING, INJECTION MOLD FOR MAKING THE HOUSING, AND METHOD FOR MAKING THE HOUSING BY USING THE INJECTION MOLD

BACKGROUND OF THE INVENTION

1. Field of the Invention

The present invention generally relates to housings, and particularly, to a housing for an electronic device, a mold for making the housing, and a method for making the housing by using the mold.

2. Discussion of the Related Art

Nowadays, portable electronic device such as mobile phones, laptops and personal digital assistants (PDAs) are widely used. Most housings of portable electronic devices are made of plastic. In fabrication of a typical housing, melted plastic is injected into injection molds and concretes to form desired housings. Furthermore, designs configured for decoration are also often formed on the housings during fabrication of the typical housing.

Referring to FIG. 6, a typical injection mold 30 configured for fabricating plastic housings with decorating designs includes a female mold 32 and a male mold 34. The female mold 32 defines a recess 322 therein. The male mold 34 includes a core insert 342 corresponding to the recess 322. The core insert 342 defines a plurality of injection canals 346 therein. In a typical process of making the plastic housings by using the injection mold 30, a film 42 is provided with a design 44 formed thereon. The design 44 is formed by applying ink or paint onto the film 42. The film 42 is placed into the injection mold 30 in such manner that one surface of the film 42 at an opposite side of the design 44 is attached to the bottom of the recess 322. The male mold 34 then engages with the female mold 32 to define a cavity (not shown), and melted plastic is injected into the cavity via the injection canals 346. When the plastic cools down to form a housing (not shown), the film 42 with the design 44 is attached to the housing.

However, due to high pressure and temperature of the melted plastic, the melted plastic may swash against the design and cause damages to the design. Additionally, some parts of the housing that are formed adjacent to the injection canals 346 may be distorted by the high pressure of the melted plastic injected from the injecting holes 346.

Therefore, an improved injection mold, a housing, and a method are desired in order to overcome the above-described shortcomings.

SUMMARY

In one aspect thereof, an injection mold is provided. The injection mold includes a female mold and a male mold matingly engageable with the female mold. The female mold has a recess portion defined therein. The male mold includes a mold core mounted thereon corresponding to the recess portion of the female mold. The mold core includes a grating pattern defined thereon and a first injection runner. The grating pattern is formed by a plurality of crisscrossed grooves. The first injection runner communicates with at least one of the grooves of the grating pattern.

In another aspect thereof, a housing is provided. The housing includes a transparent film, a decorative coating formed on the transparent film, and a molded part moldingly attached to the decorative coating. The molded part has a grating grid formed at an opposite side to the decorative coating. The grating grid is formed by a plurality of projected strips.

In another aspect thereof, a method for making a housing is provided. The method includes following steps. Firstly, a transparent film with a decorative coating formed thereon is provided. Secondly, an injection mold is provided. The injection mold includes a female mold having a recess portion defined therein and a male mold matingly engageable with the female mold. The male mold includes a mold core mounted thereon corresponding to the recess portion of the female mold. The mold core includes a grating pattern defined thereon and a first injection runner. The grating pattern is formed by a plurality of grooves communicating with each other. The first injection runner communicates with at least one of the grooves of the grating pattern. Thirdly, the transparent film with the decorative coating is placed into the recess portion of the female mold, with the decorative coating facing the male mold. Finally, the injection mold is closed, and a melted moldable material is injected into a molding cavity defined between the recess portion and the mold core via the first injection runner to form a molded part onto the transparent film.

Other advantages and novel features will become more apparent from the following detailed description of preferred embodiments when taken in conjunction with the accompanying drawings.

BRIEF DESCRIPTION OF THE DRAWINGS

Many aspects of the injection mold can be better understood with reference to the following drawing. The components in the drawing are not necessarily drawn to scale, the emphasis instead being placed upon clearly illustrating the principles of the housing for an electronic device. Moreover, in the drawing like reference numerals designate corresponding parts throughout the several views therein.

DETAILED DESCRIPTION OF THE PREFERRED EMBODIMENTS

Figure 1:
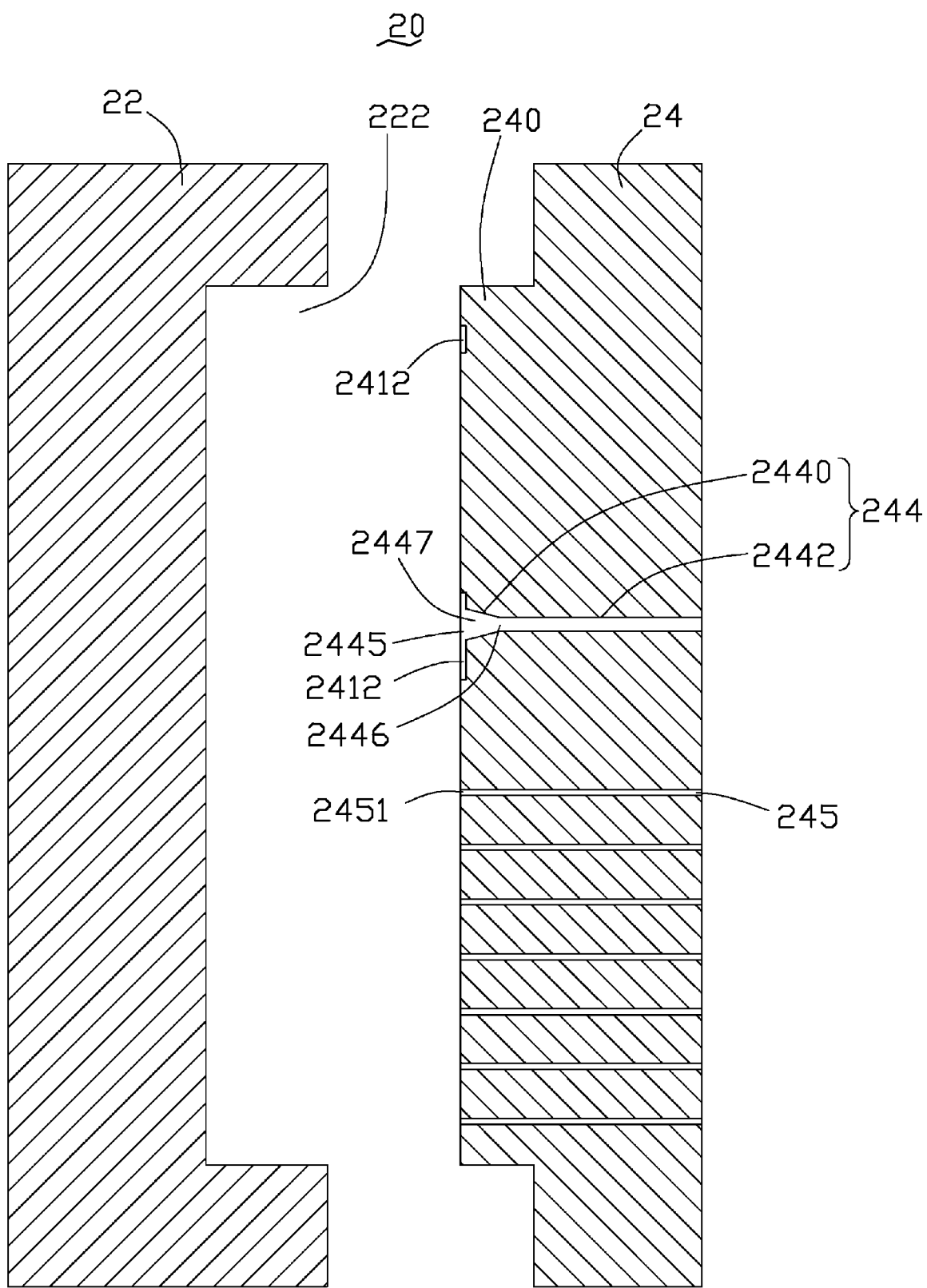
FIG. 1 is a disassembled, cross-section view of a present embodiment of an injection mold.
Figure 2:
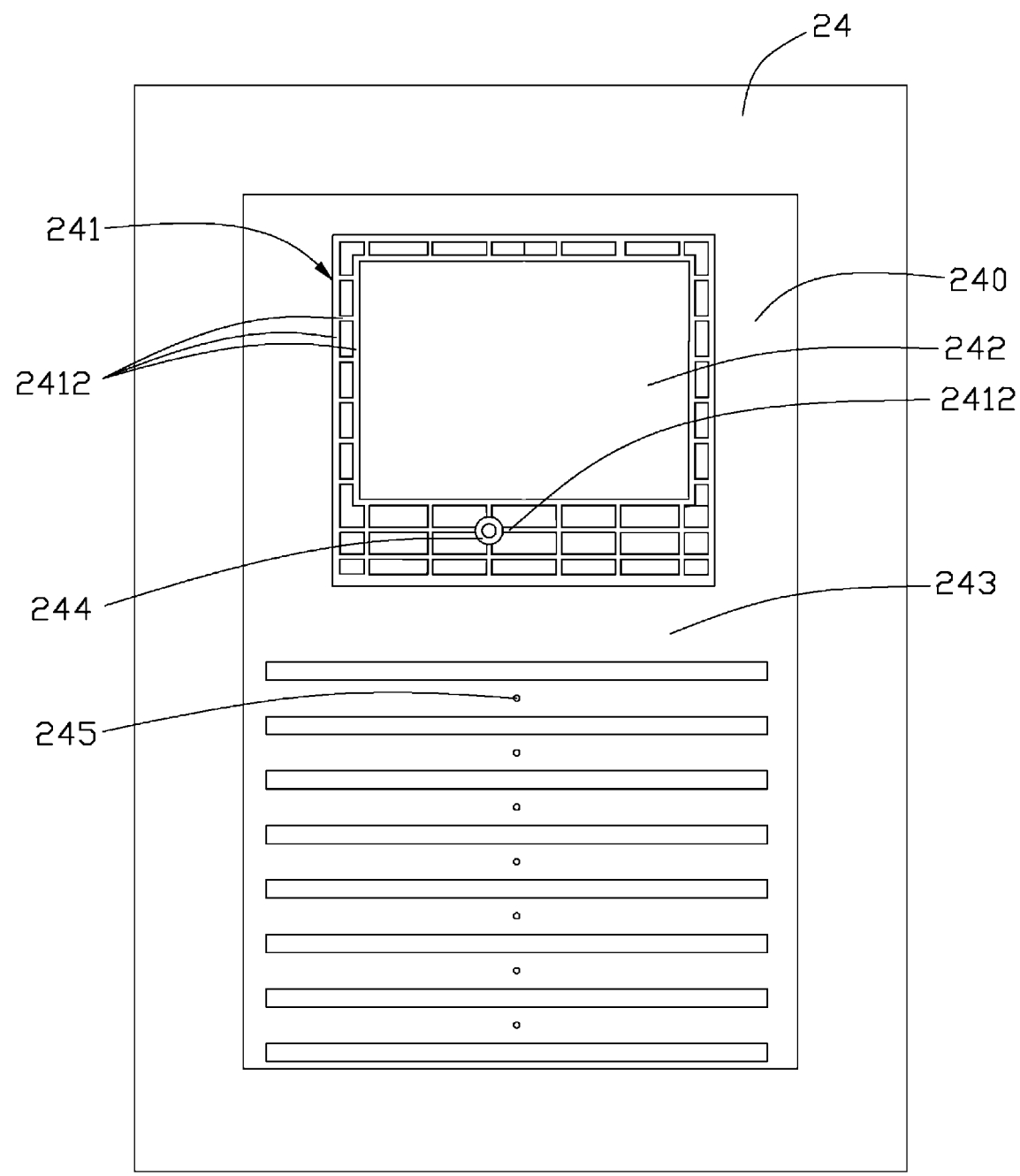
FIG. 2 is a plan view of a present embodiment of a male mold of the injection mold shown in FIG. 1.
Figure 3:
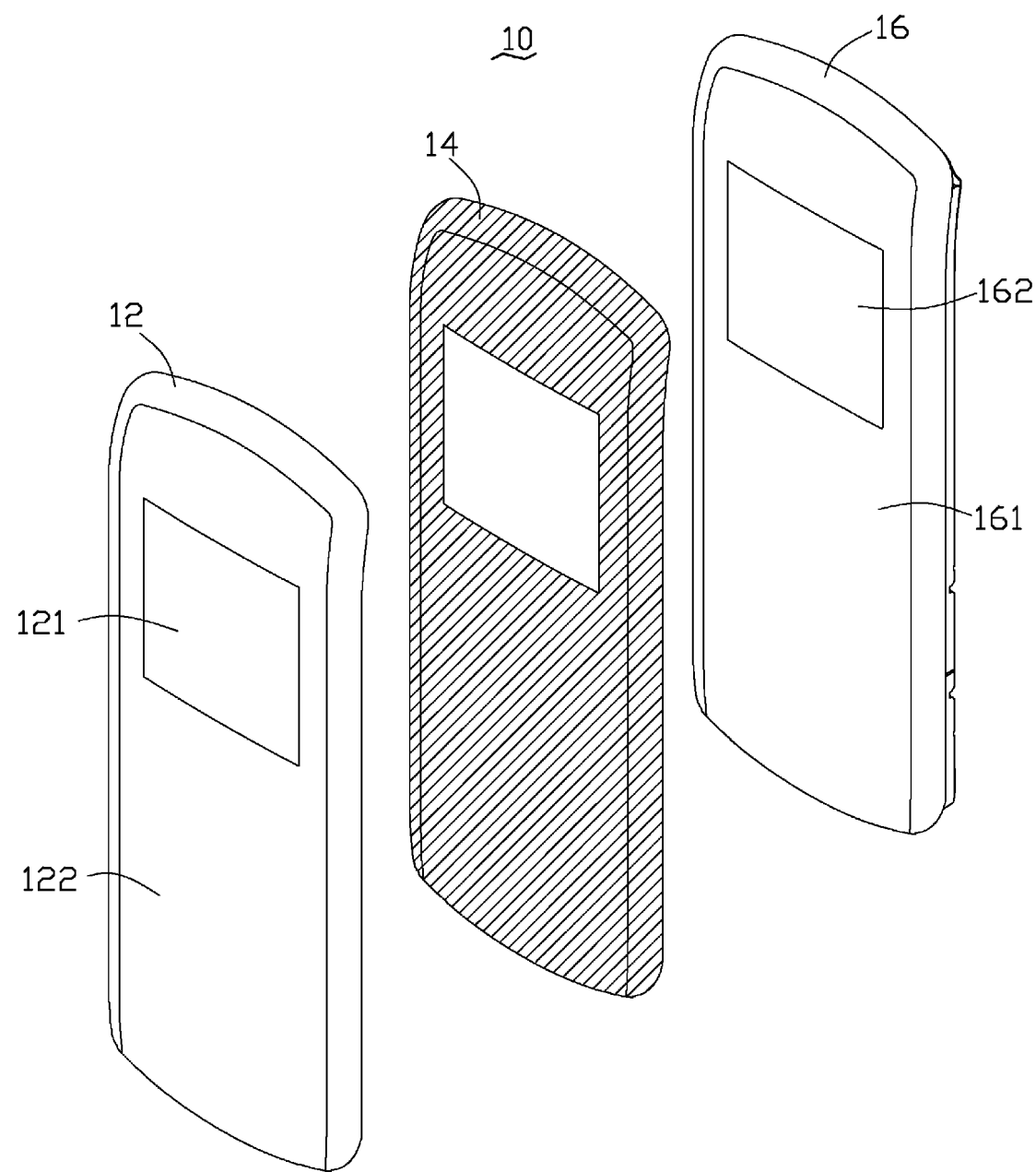
FIG. 3 is a disassembled view of a housing made by the injection mold shown in FIG. 1.

Referring to FIG. 2 and FIG. 3, in a present embodiment, an injection mold 20 includes a female mold 22 and a male mold 24 matingly engageable with the female mold 22.

The female mold 22 includes a recess portion 222. The male mold 24 has a mold core 240 mounted thereon corresponding to the recess portion 222 of the female mold 22. The mold core 240 has at least one major injection runner 244 formed therein and, optionally, a plurality of second injection runners 246 formed therein.

The mold core 240 includes a grating pattern 241 formed by a plurality of crisscrossed parallel narrow grooves 2412, a smooth molding section 242 configured (i.e., structured or arranged) for molding a lens portion of an article (not shown), a general molding section 243 adjacent the grating pattern 241, a first injection runner 244 communicating the grating pattern 241, and a plurality of second injection runners 245 defined in the general molding section 243. The narrow grooves 2412 of the grating pattern 241 are arranged around the smooth molding section 242 and communicate with each other. The grating pattern 241, the smooth molding section 242, and the general molding section 243 face the recess portion 222 of the female mold 22, when the male mold 24 engaging with the female mold 22.

The first injection runner 244 includes a first injection runner portion 2440 and a second injection runner portion 2442 having a size less than that of the first injection runner portion 2440. The first injection runner portion 2440 has an injection runner exit 2445 and an injection runner node 2446 communicating with (i.e., connecting or adjacent to) the second injection runner portion 2442. The injection runner exit 2445 has a size larger than that of the injection runner node 2446. The diameter of first injection runner portion 2440 is gradually increased from the injection runner node 2446 to the injection runner exit 2445. Thus, a segmental pyramidal space 2447 is defined between the injection runner exit 2445 and the injection runner node 2446. Understandably, any other desired shaped space can be defined between the injection runner exit 2445 and the injection runner node 2446. The injection runner exit 2445 of the first injection runner 244 is disposed at the grating pattern 241, especially, disposed at a point of intersection of two crisscrossed narrow grooves 2412 of the grating pattern 241. The first injection runner 244 communicates with at lease one of the plurality of narrow grooves 2412.

Each of the second injection runners 245 has a size less than that of the first injection runner 244. Each of the plurality of second injection runners 245 has an assistant exit 2451 symmetrically disposed in the general molding section 243.

Figure 4:
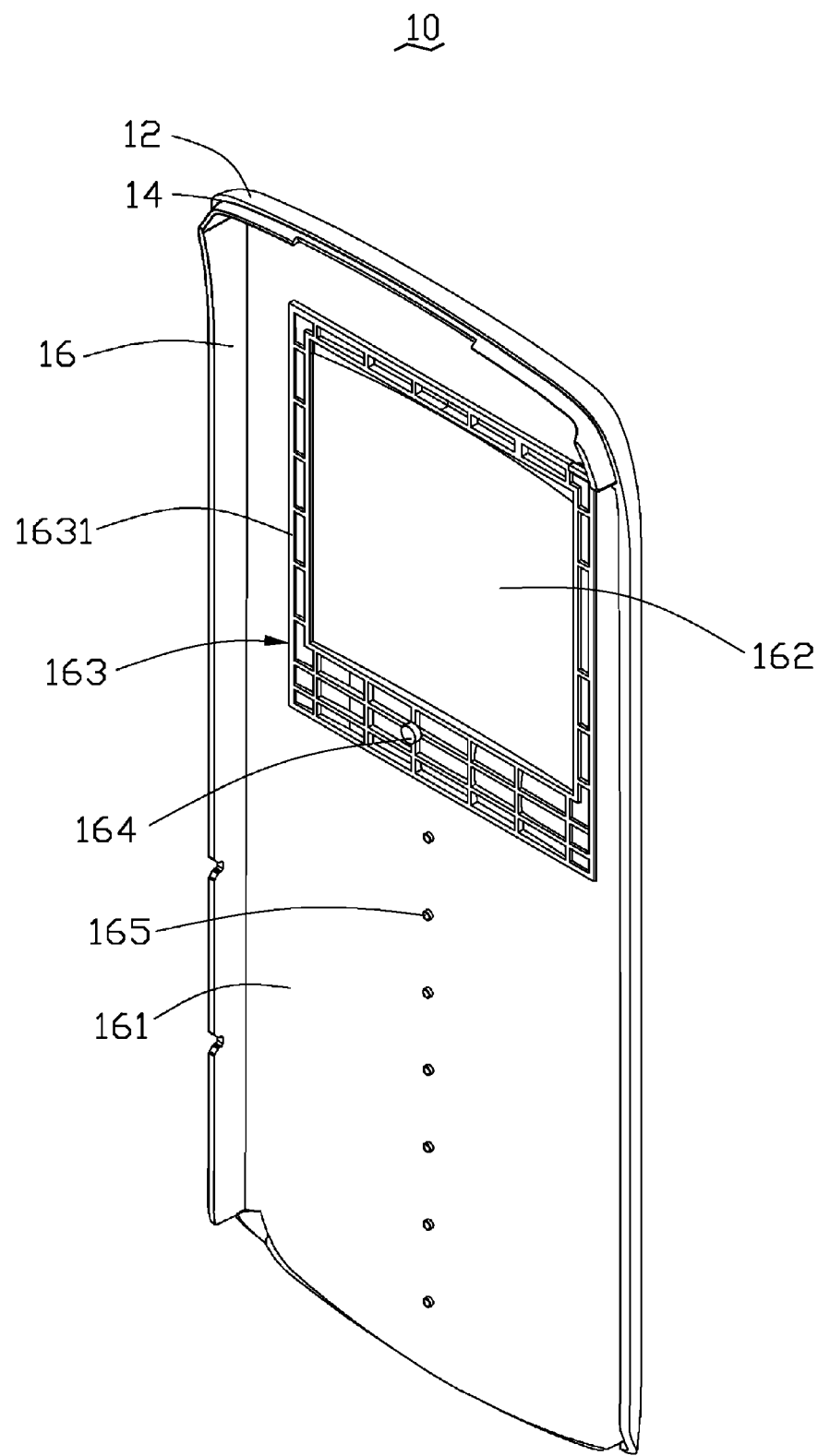
FIG. 4 is a schematic view of the housing shown in FIG. 3.
Figure 5:
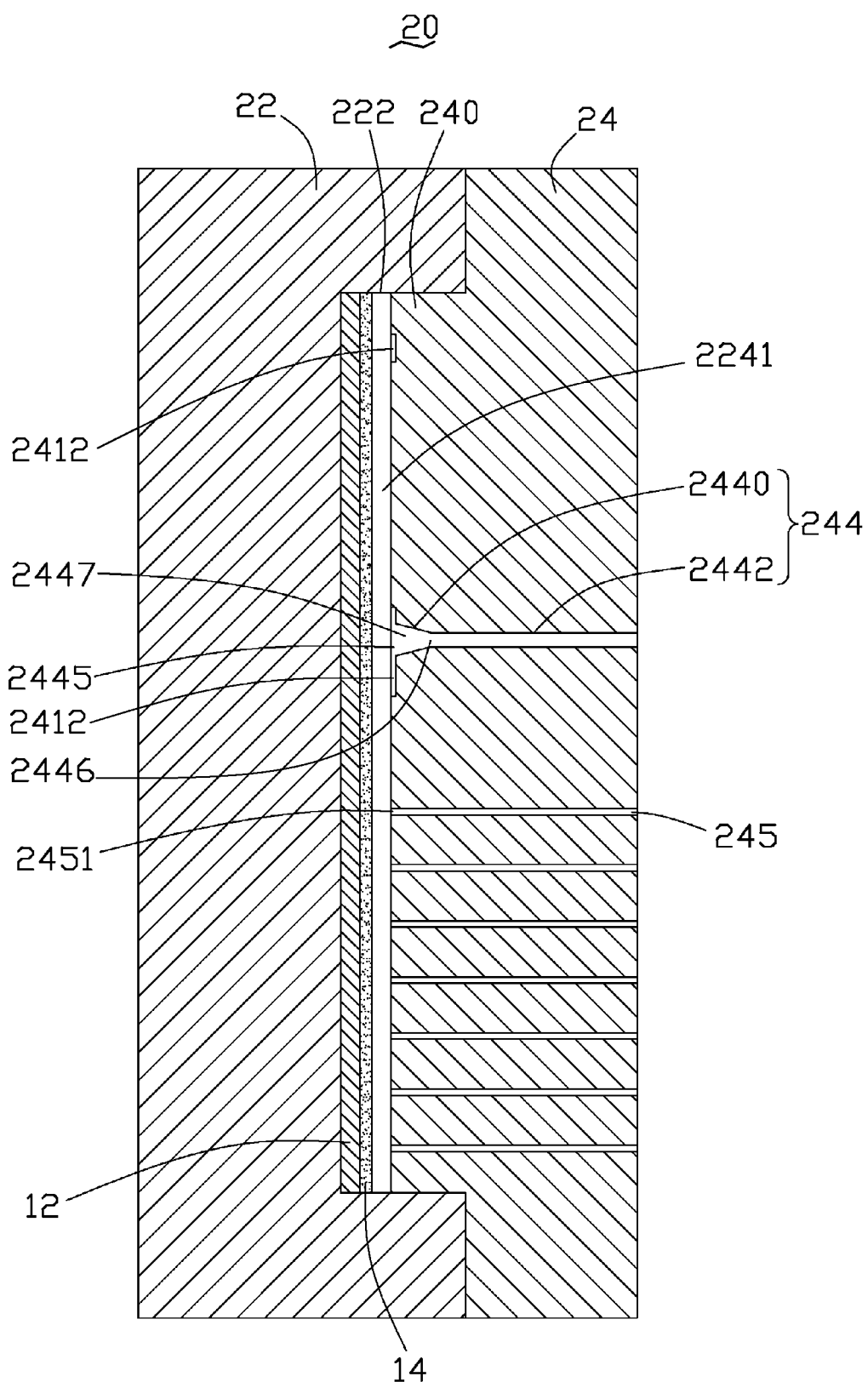
FIG. 5 is a cross-section view of the injection mold shown in FIG. 1 at a close state.

Referring to FIG. 4 and FIG. 5, a housing 10 made by the injection mold 20 is provided. The housing 10 includes a transparent film 12, a decorative coating 14 formed on the transparent film 12, and a molded part 16 moldingly attached to the decorative coating 14 and, optionally, to the transparent film 12, if the decorative coating 14 does not entirely cover the transparent film 12.

The transparent film 12 is made of transparent plastic selected from a group consisting of polycarbonate, polymethyl methacrylate, polystyrene, acrylonitrile butadiene styrene, or any desired combination thereof. The transparent film 12 comprises a display section 121 functioning as a lens capable of transmitting light, and a decorative section 122 around the display section 121.

The decorative coating 14 is made of ink or paint. The decorative coating is formed on the decorative section 122 of the transparent film 12 and around the display section 121 of the transparent film 12.

The molded part 16 is made of a transparent moldable material selected from a group consisting of polycarbonate, polymethyl methacrylate, polystyrene, acrylonitrile butadiene styrene, silica gel, clear rubber, and any desired combination thereof. The molded part 16 includes a main body 161 molded onto the decorative coating 14 and a lens portion 162 molded onto the display section 121 of the transparent film 12.

The main body 161 has a grating grid 163, a first protruding post 164, and a plurality of second protruding posts 165 formed thereon. The grating grid 163, the first protruding post 164, and the plurality of second protruding posts 165 are all formed on the main body 161 at an opposite side to the decorative coating 14. The grating grid 163 is formed by a plurality of crisscrossed parallel projected strips 1631. That is, each of the projected strips 1631 intersects with at least one of the others of the projected strips 1631. The plurality of crisscrossed parallel projected strips 1631 are formed around the lens portion 162. The first protruding post 164 is projected from the grating grid 163, especially, projected from a point of intersection of two crisscrossed projected strips 1631. The plurality of second protruding posts 165 are symmetrically formed on the main body 161.

Figure 6:
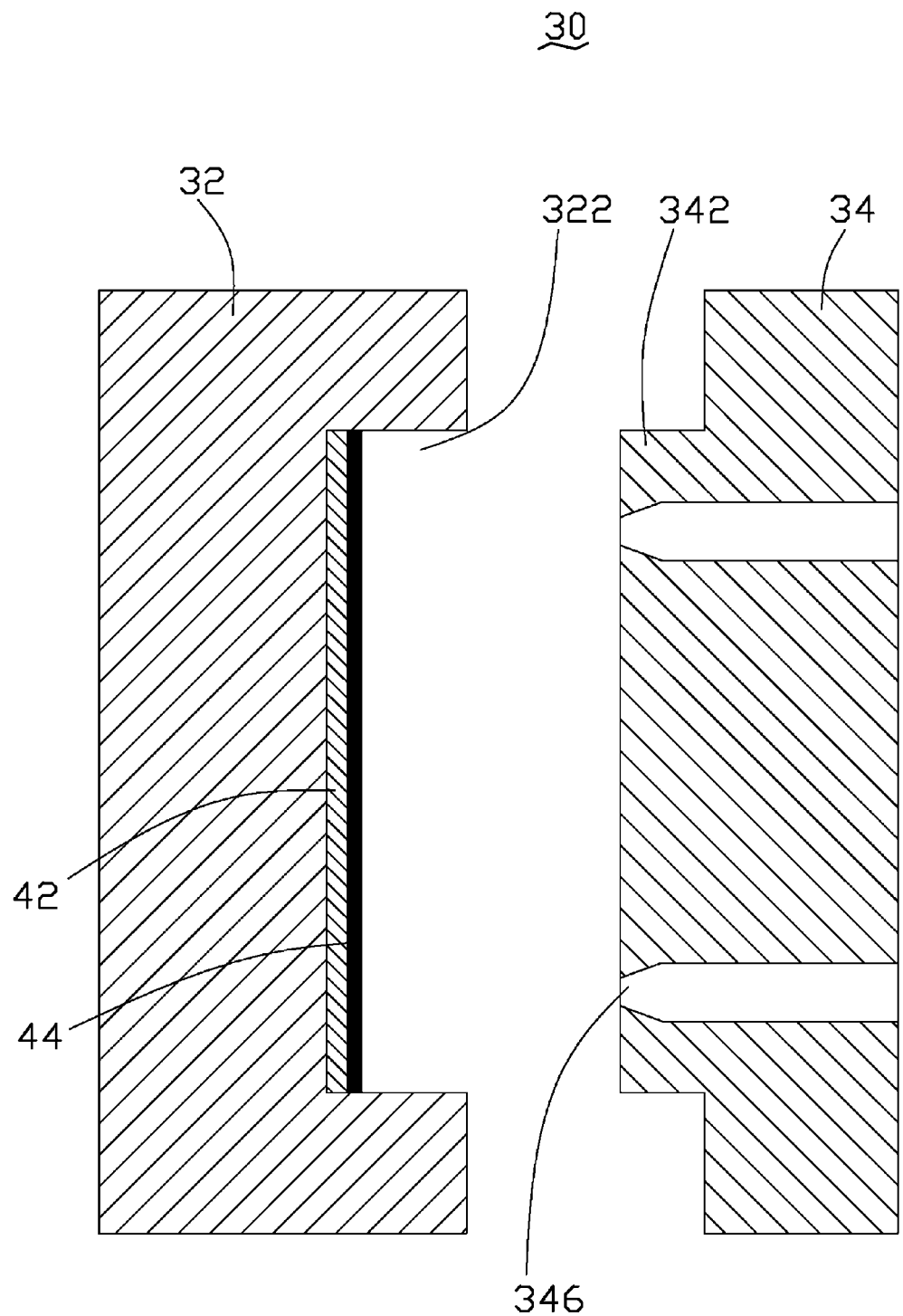
FIG. 6 is a cross-sectional view of a typical injection mold.

A method for making the housing 10 by using the injection mold 20 is provided. Firstly, the injection mold 20 and the transparent film 12 coated with the decorative coating 14 are provided. Secondly, the transparent film 12 is placed into the recess portion 222 of the female mold 22, with the decorative coating 14 facing the mold core 240 of the male mold 24. Thirdly, referring to FIG. 6, the injection mold 20 is closed, and a melted moldable material (not shown) such as resin, rubber, or silica gel, is injected into a molding cavity 2241 defined between the recess portion 222 and the mold core 240 via the first injection runner 244 and the second injection runners 245. Finally, the melted moldable material is cooled. As such, the housing 10 is obtained. The grating grid 163 of the housing 10 is formed corresponding to the grating pattern 241 of the mold core 240. The first protruding post 164 of the housing 10 is formed corresponding to the first injection runner 244 defined in the mold core 240. The plurality of second protruding posts 165 is formed corresponding to the second injection runners 245 defined in the mold core 240.

During the injection process of the method for making the housing 10, due to the size of the injection runner exit 2445 of the first injection runner 244 larger than that of the injection runner node 2446, the pressure of the melted moldable material is decreased, when the melted moldable material entering into the segmental pyramidal space 2447 of the first injection runner 244. Further, when the melted moldable material enters into the molding cavity 2241, the melted moldable material can be diffused along the narrow grooves 2412 of the grating pattern 241, thereby decreasing the pressure of the melted moldable material and reducing impact of the melted moldable material upon the decorative coating 14 around the display section 121 of the transparent film 12. That is, the grating pattern 241 of the mold core 240 can reduce potential damages resulting from ink particles or paint articles of the decorative coating 14 being impacted into the display section 121.

Additionally, when the melted plastic is injected into the molding cavity 2241 via the second injection runners 245, the housing 10 can be formed more evenly.

It should be understood that even though numerous characteristics and advantages of the present embodiments have been set forth in the foregoing description, together with details of the structures and functions of the embodiments, the disclosure is for illustrative only, and changes may be made in detail, especially in matters of shape, size, and arrangement of parts within the principles of the invention. All such modification and variation are indicated to the full extent by the broad general meaning of the terms in which the appended claims are expressed.

What is claimed is:

1. A housing, comprising:
   a transparent film comprising a display section and a decorative section around the display section;
   a decorative coating formed on the decorative section of the transparent film, and around the display section of the transparent film; and
   a molded part moldingly attached to the decorative coating, the molded part having a main body molded onto the decorative coating, a lens portion molded onto the display section of the transparent film and a grating grid formed at an opposite side to the decorative coating, the grating grid being formed by a plurality of projected strips.

2. The housing as claimed in claim 1, wherein the transparent film is made of transparent plastic selected from a group consisting of polycarbonate, polymethyl methacrylate, polystyrene, acrylonitrile butadiene styrene, or any desired combination thereof.

3. The housing as claimed in claim 1, wherein the display section functions as a lens capable of transmitting light, the decorative coating is formed on the decorative section.

4. The housing as claimed in claim 1, wherein the decorative coating is made of ink or paint.

5. The housing as claimed in claim 1, wherein the molded part is made of a transparent moldable material selected from a group consisting of polycarbonate, polymethyl methacrylate, polystyrene, acrylonitrile butadiene styrene, silica gel, clear rubber, and any desired combination thereof.

6. The housing as claimed in claim 1, wherein the grating grid being formed on the main body at an opposite side to the decorative coating, the projected strips of the grating grid being formed around the lens portion.

7. The housing as claimed in claim 1, wherein each of the projected strips intersects with at least one of the others of the projected strips.

8. The housing as claimed in claim 7, wherein the molded part further has a protruding post projected from the grating grid.

9. The housing as claimed in claim 8, wherein the protruding post is projected from a point of intersection of two intersected projected strips.

* * * * *